(12) United States Patent
Lanza et al.

(10) Patent No.: US 6,417,272 B1
(45) Date of Patent: *Jul. 9, 2002

(54) PROCESS FOR THE PREPARATION OF BLOCK COPOLYMERS

(75) Inventors: Emmanuel Lanza, Waterloo; Jean Naveau, Nivelles, both of (BE)

(73) Assignee: Fina Research, S.A., Feluy (BE)

(*) Notice: Subject to any disclaimer, the term of this patent is extended or adjusted under 35 U.S.C. 154(b) by 0 days.

This patent is subject to a terminal disclaimer.

(21) Appl. No.: 09/642,443

(22) Filed: Aug. 23, 2000

Related U.S. Application Data

(63) Continuation of application No. 09/287,685, filed on Apr. 7, 1999, now Pat. No. 6,153,695, which is a continuation of application No. 08/196,331, filed on Feb. 14, 1994, now abandoned.

(51) Int. Cl.$^7$ .................. C08F 293/00; C08F 297/04
(52) U.S. Cl. .................. 525/107; 525/122; 525/256; 525/266; 525/313; 525/314; 525/315; 525/316; 525/332.9; 525/333.3

(58) Field of Search .................. 525/256, 266, 525/313, 314, 315, 316, 332.9, 333.3, 107, 111.5, 122

(56) References Cited

U.S. PATENT DOCUMENTS

| | | |
|---|---|---|
| 3,281,383 A | 10/1966 | Zelinski et al. |
| 3,987,006 A | 10/1976 | Kitchen et al. |
| 4,051,197 A | 9/1977 | Fodor .................. 525/89 |
| 4,089,824 A | 5/1978 | Bronstert et al. .......... 524/534 |
| 4,091,053 A | 5/1978 | Kitchen |
| 4,120,915 A | 10/1978 | Fodor et al. |
| 4,136,137 A | 1/1979 | Hsieh et al. |
| 4,418,180 A | 11/1983 | Heinz et al. .......... 525/317 |
| 4,584,346 A | 4/1986 | Kitchen .......... 525/98 |
| 4,956,408 A | 9/1990 | Mathis et al. .......... 524/147 |

Primary Examiner—Jeffrey Mullis
(74) Attorney, Agent, or Firm—Roberts, Abokhair & Mardula

(57) ABSTRACT

A process is disclosed for manufacturing coupled radial block copolymers of the S—B—Li type having improved optical properties, which process utilizes coupling agents having from about 3 to about 7 epoxy groups per mole.

19 Claims, 3 Drawing Sheets

PROCESS FOR THE PREPARATION OF BLOCK COPOLYMERS

CROSS-REFERENCE TO RELATED APPLICATION

This application is a continuation of copending U.S. application Ser. No. 09/287,685, filed 04/07/99, which now U.S. Pat. No. 6,153,195 is a continuation of the U.S. patent application having Ser. No. 08/196,331 filed on Feb. 14, 1994, now abandoned.

BACKGROUND OF THE INVENTION

The present invention relates to a new process for the preparation of block copolymers in the presence of agents for coupling polymeric blocks, and more particularly involves a process for the preparation of radial block copolymers formed from polyvinylaromatic conjugated polydiene blocks which have been formed using agents comprising epoxy groups.

The present invention also relates to radial block copolymers prepared with new coupling agents and having improved physical properties with respect to those of block copolymers prepared with conventional coupling agents.

The coupling of polymer chains terminated by a lithium atom (also called living based polymers) is well-known in the field, as are the coupling agents used for such purposes. In general, a polymer chain terminated by a lithium atom is reacted with a compound having two or more functional groups capable of reacting with the carbon-lithium bond of the polymer chain.

Depending on whether the intention is to form radial polymers or multi-branched polymers, coupling agents having more than two reactive sites or reaction groups may be used.

European Patent No. 2012 discloses the use of systems of polyfunctional coupling agents in which the addition of a polyvinyl monomer which acts as a non-deactivating coupling agent is used in the first instance, and a di- or trifunctional coupling agent, which may or may not be deactivating, is used in the second instance. This type of system of coupling agents leads to numerous branchings which are difficult to control.

U.S. Pat. No. 4,304,886 discloses the use of mixtures of coupling agents, which may be any coupling agents, in order to obtain a polymer having a desired total functionality greater than 2 without having to blend several polymers. However, the patent teaches that such systems using mixed coupling agents leads to worse mechanical properties.

U.S. Pat. No. 3,880,954 describes the use of alkylpolyalkoxysilane as the sole coupling agent, having at least two and preferably three alkoxy groups. However, this type, of agent alone does not produce the properties desired to be obtained, and moreover it leads to the formation of troublesome by-products, such as the corresponding alcohols.

It is well-known that the residue of the coupling agents remains in the copolymer formed and is thus capable of causing toxic residues or other unwanted products in the polymers, which products may be troublesome in certain uses and, in particular, in the foodstuff packaging sector. This phenomenon is particularly important when one of the coupling agents is silicon tetrachloride ($SiCl_4$). Indeed, when $SiCl_4$ is used as coupling agent, lithium chloride (LiCl) is formed as by-product. The presence of LiCl is not only detrimental to the optical properties of copolymers (causing unwanted opacity), but also induces thermal aging of the copolymers.

There is thus a need for the development of a process for the preparation of block copolymers which utilizes coupling agents which do not form toxic or unwanted products, but which are able to achieve the desired physical properties, and especially transparency. Transparency, or improved optical properties are an issue when the copolymers contain less than sixty percent (60%) by weight of the of the mono vinyl aromatic component. The conjugated polydiene block component adversely affects the optical properties of the final copolymer when present in amounts greater than thirty percent (30%) by weight.

SUMMARY OF THE INVENTION

The present invention discloses a process for the preparation of vinylaromatic conjugated diene copolymers with coupling agents which provide block copolymers having improved physical properties, including improved optical properties.

The aim of the present invention is also the preparation of vinylaromatic conjugated diene block copolymers utilizing coupling agents which form essentially no residual toxicity.

The process of this invention involves the production of block copolymers by the coupling of block base copolymers terminated by a lithium atom of the typical formula S—B—Li, in which S is a monovinylaromatic hydrocarbon block and B is a conjugated diene block. The monovinylaromatic hydrocarbon block is present in an amount from about 20 to about 60 percent by weight. Improved optical properties in such copolymers are referred to as decolorization of the block copolymers. The process is characterized in that it uses at least one coupling agent comprising from 3 to 7 epoxy groups per molecule, and preferably from 4 to 6 epoxy groups per molecule.

DESCRIPTION OF THE PREFERRED EMBODIMENT

In the process, a block base copolymer is prepared by copolymerization of a vinylaromatic monomer to give a first block denoted S, in the presence of an organolithium compound as a catalyst, and an inert hydrocarbon solvent. A conjugated diene monomer is then added to the reaction medium to give a block copolymer of the type S—B—Li, in which B represents the conjugated diene block. The process of the present invention is applicable to copolymers having a vinyl aromatic component content of from 20% to 60% percent by weight or the final product. The conjugated diene block content is greater than or equal to 40% by weight.

The catalyst used is generally an alkyllithium, and can be a branched alkyllithium such as those having secondary alkyl radicals with 3 to 8 carbon atoms. However, n-butyllithium is preferably used for reasons of ease of procurement and storage stability.

The solvents used are generally paraffinic, cyloparaffinic and aromatic hydrocarbons and their mixtures. Examples are n-pentane, n-hexane, n-heptane, 2,2,4-trimethylpentane, cyclohexane, cyclopentane. benzene, toluene and xylene. Polar solvents, such as cyclic ethers (THF), acyclic ethers, or tertiary amines can also be incorporated in order to obtain the formation of a specific polymeric microstructure, such as, for example, an increased amount of vinyl units, as well as random S B blocks.

It was noted that at this stage of the process, reacting the block base copolymer which has been terminated by a lithium atom (called the living base polymer) with at least one coupling agent comprising from 3 to 7 epoxy groups per molecule, and preferably from 4 to 6 epoxy groups per molecule at a rate of 0.1 to 1 phr (per hundred resin or per hundred rubber) and more preferably at a rate of 0.2 to 0.75 phr of the total polymers obtained by coupling, improves the physical properties of the block polymers, in particular the optical properties, while avoiding increases in residual toxicity. The optical properties, i.e., the clarity of the final product, become important where the vinyl aromatic content is lower than 70% by weight and particularly when lower than or equal to 60% by weight, In accordance with the present invention, utilization of the particular coupling agents results in improved optical properties, sometimes referred to as decolorization. By decolorization, we mean a resultant product having improved optical properties.

Figure 1:
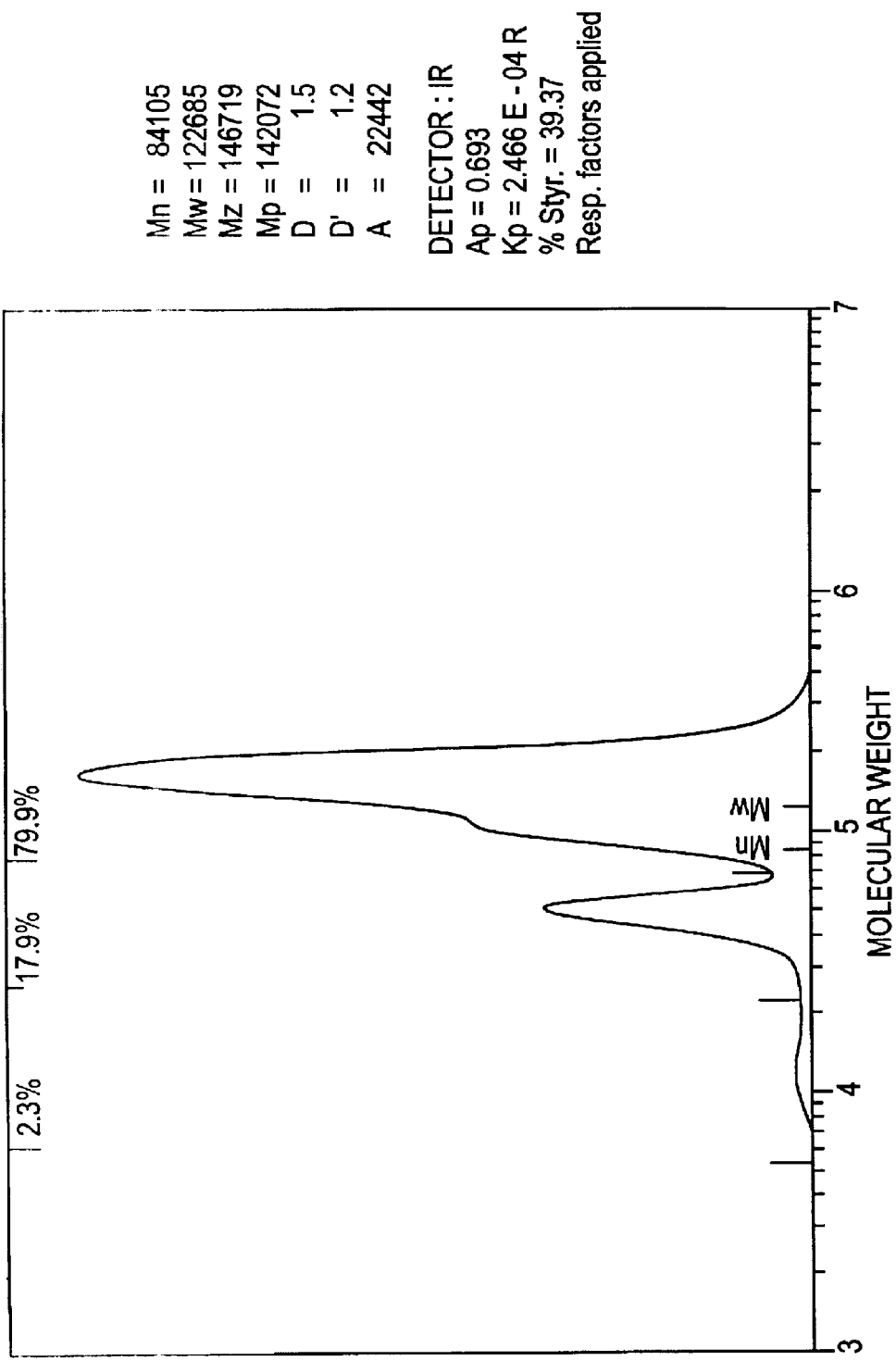
FIGS. 1–3 represent molecular weight distributions prepared in graphical form, as determined by gel permeation chromatography.
Figure 2:
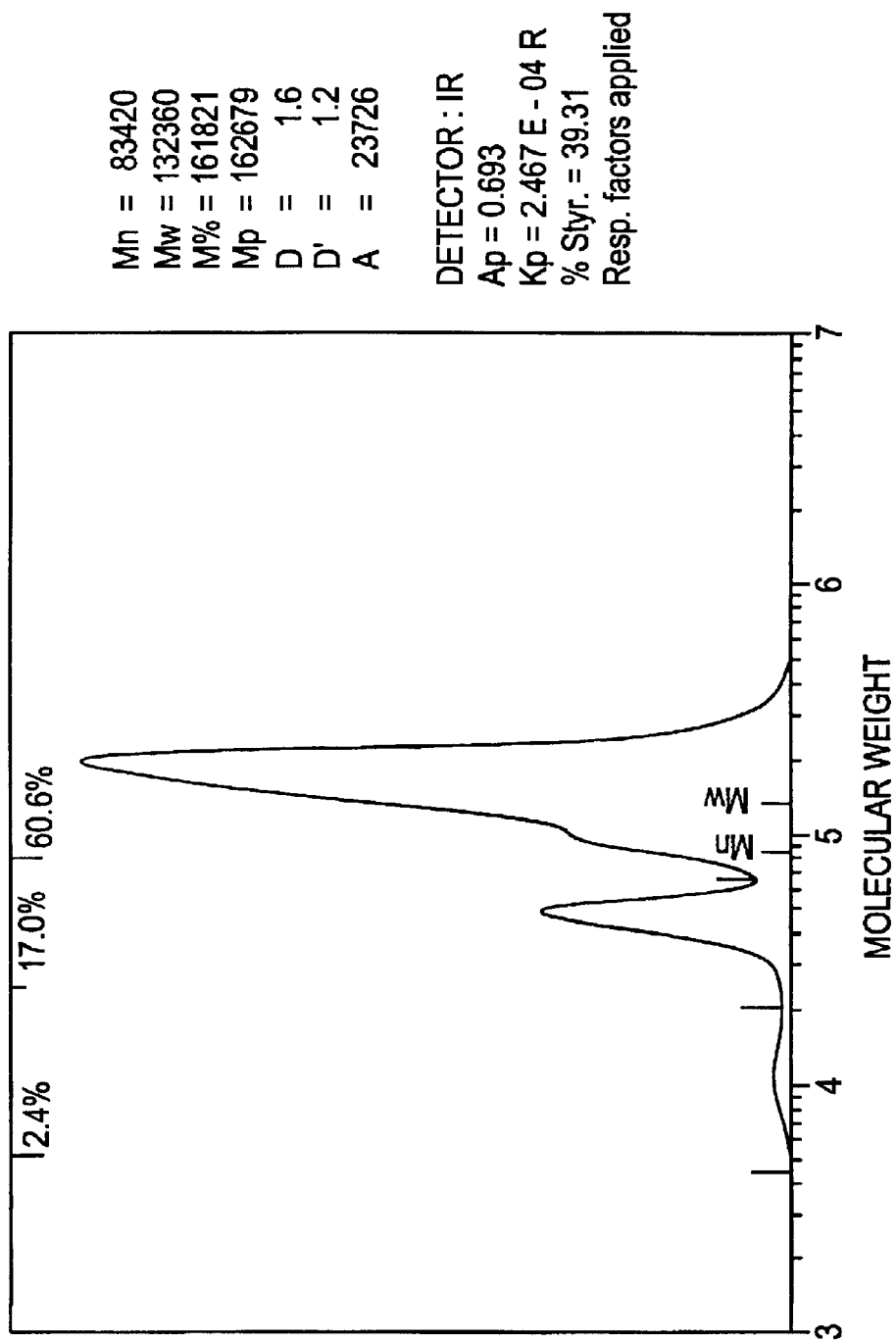
Figure 3:
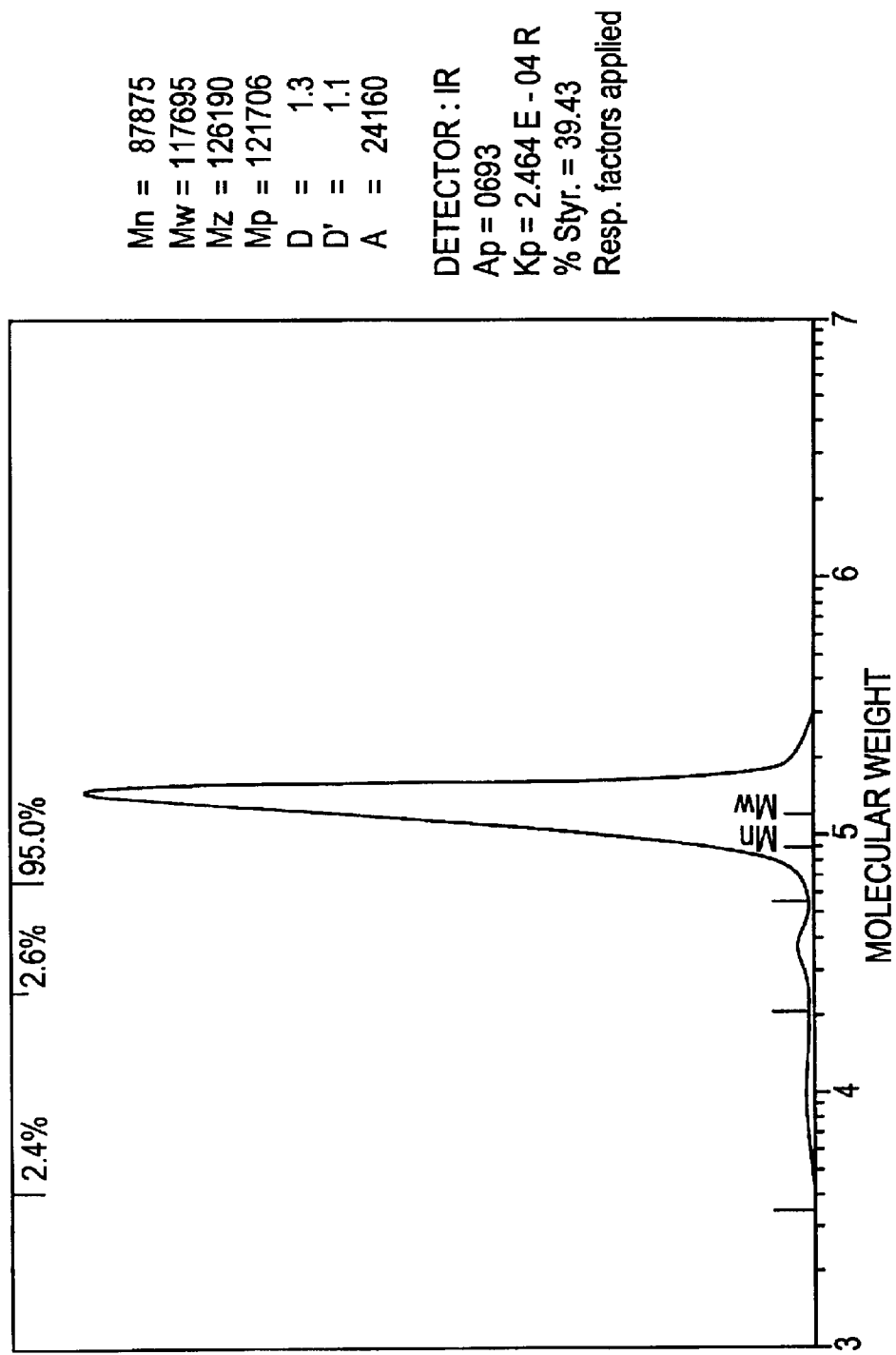

Moreover, it has been unexpectedly found that the present invention be utilized to provide copolymers having a broader molecular weight distribution, which in turn improves rheologic properties. FIGS. 1 to 3 illustrate clearly this broadening of molecular weights. These figures come from chromatographic analysis of the block copolymers by gel permeation. FIGS. 1, 2 and 3 correspond respectively to examples 2, 4 and 6 of Table 1.

Among the coupling agents which may be used in the present invention are agents of the epoxidized vegetable oil type, epoxidized polybutadienes, and, epoxidized tetrallylether pentaerythritol. Polyepoxidized vegetable oils such as epoxidized soybean oil or epoxidized linseed oil comprising 3 to 7 epoxy groups per mole, preferably 4 to 6 epoxy groups per mole, are the preferable coupling agents.

The amounts of coupling agent to be used can easily be calculated. The reaction between a coupling agent having a molecular weight $M_1$ and a functionality n, and S—B—Li chains of molecular weight $M_2$, carried out in a molar ratio of 1:n will theoretically give a copolymer of molecular weight $M_1+nM_2$, reduced by the molecular weight of the coupling by-products. Deviations in actual results are due essentially to traces of impurities, or to heat, which can, for example, deactivate the S—B—Li chains (giving copolymers with a molecular weight of about $M_1$ in the final product). The total amount of coupling agents used is preferably an amount calculated to couple all the S—B—Li chains, but less can be used if preservation of an increased proportion of the S—B copolymers in the final product is desired. It is also noted that the amount of coupling agents may vary with differences in the epoxy groups number.

The vinylaromatic compound which constitutes the block S of the block copolymer can be styrene, vinyltoluene, vinylxylene or vinylnaphthalene; while the conjugated dienes are generally chosen from butadiene, isoprene, methylisoprene and their homologues.

The block copolymer formed according to the process of the invention is present in a radial or polybranched form.

The molecular weight (weight-average) of the base copolymer can vary within wide limits and is generally between about 10,000 and 150,000 and preferably between 15,000 and 100,000, with the polyvinylaromatic block representing 20 to 60% by weight, preferably 30 to 50%, and most preferably about 40%, of the base copolymer.

The process according to the invention is generally practiced by polymerizing a first block of vinylaromatic monomer, which is usually styrene, at a temperature between about 20 and 60° C. for a period of 20 minutes to 1 hour in the presence of cyclohexane solvent.

When all the vinylaromatic monomer has been polymerized, a monomer of a conjugated diene, such as 1,3-butadiene, is introduced into the solution. This monomer reacts entirely at the living ends of the polymer.

When this stage of the process has been reached, polymeric chains of the type S—B—Li have been formed. The coupling agents as defined above are then introduced. The coupling reaction takes 0.1 to 1 hour at a temperature between 10 and 120° C.

During the coupling step lithium alcoholates are formed which are grafted to the polymeric chains. Although it is not essential, these alcoholates may be generally neutralized by addition of an acid compound.

After the coupling step, any non-coupled living polymeric chains present can be deactivated by addition of a customary chain terminator, such as an alcohol or a polyalkylphenol.

An antioxidant system suitable for the final use may be then added. In principle, there should be no coupling agent which has not reacted, any excess which has not reacted having been converted into non-toxic residues by steam removal of the solvent.

The following examples are given for better illustration of the process of the present invention.

Examples

Styrene was first polymerized in the presence of n-butyllithium catalyst and cyclohexane as the solvent. The reaction was started at a temperature of 50 to 55° C. and ended at a temperature of about 60 to 65° C.

1,3-butadiene in a cyclohexane solvent was then added. This polymerization was carried out at a temperature between 60 and 90° C. When this polymerization ended, living chains of the type S—B—Li had been obtained.

Types and quantities of coupling agents that were then added are indicated in Table 1.

The coupling reaction took 1 hour at 50° C.

The characteristics of the radial block copolymers obtained (still called pure polymer) are also indicated in Table 1.

TABLE 1

| Examples Type | Coupling Agent Concentration (phr) (d) | Total Styrene (weight %) | Molecular weight (weight average) | Coupling index (c) | Mw/Mn |
|---|---|---|---|---|---|
| 1. soybean oil (a) | 0.750 | 40.3 | 64700 | 2.5 | 1.4 |
| 2. soybean oil (a) | 0.250 | 39.4 | 122685 | 3.9 | 1.5 |
| 3. linseed oil (b) | 0.575 | 39.4 | 83600 | 2.4 | 1.3 |
| 4. linseed oil (b) | 0.242 | 39.3 | 132360 | 4.8 | 1.6 |
| 5. SiCl$_4$ | 0.153 | 38.8 | 112400 | 3.7 | 1.3 |
| 6. SiCl$_4$ | 0.150 | 39.4 | 117695 | 3.9 | 1.3 |

(a). The soybean oil contains 4.4 epoxy groups per molecule
(b). The linseed oil contains 5.8 epoxy groups per molecule
(c). final molecular weight/"base polymer" molecular weight
(d). "phr" means per hundred rubber or per hundred resin as the case may be It is interesting to note that a coupling index of 2.5 is obtained when soybean is used at a concentration of 0.75 phr example 1); such concentration is defined as "stoichiometric" between the base polymer and the functional groups represented only by the soybean oil 4.4 epoxy groups. On the other hand, a coupling index of 3.9 is obtained when soybean is used at a concentration of 0.25 phr (example 2); in this case, such concentration is defined as "stoichiometric" between the base polymer and all the functional groups available in the soybean oil, i.e. the 4.4 epoxy groups plus the ester functions. When considering the total amount of reactive functions it is believed that soybean oil is approximately decafunctional.

A similar observation can be done with linseed oil, which is considered as 5.8-functional in example 3 and as 11.8-functional in example 4.

After addition of antioxidants, the copolymers coming from examples 2,4 and 5 were then subjected to steaming treatment to remove the solvent.

TABLE 2

| Examples | Time (days) | Haze (%) (1) | Transmittance (%) (1) |
|---|---|---|---|
| 2 | 0 | 5.3 | 87.8 |
|  | 5 | 5.5 | 88.2 |
|  | 10 | 5.7 | 88.4 |
|  | 15 | 5.7 | 88.3 |
| 4 | 0 | 9.8 | 89.2 |
|  | 5 | 10.1 | 89.0 |
|  | 10 | 10.7 | 89.2 |
|  | 15 | 10.3 | 89.1 |
| 5 | 0 | 59.5 | 81.5 |
|  | 5 | 87.1 | 79.0 |
|  | 10 | 86.3 | 78.8 |
|  | 15 | 85.1 | 79.6 |

(1) norm ASTM D 1003-C1 (Hazemeter type XL211 "hazegard"/Gardner)

The evolution over the course of time of the optical properties of the copolymers of examples 2,4 and 5 are indicated in Table 2. The evolution over time of the thermal stabilities of the copolymers of examples 4 and 5 are indicated in Table 3. These copolymers were subjected to thermal aging under air at 80° C. in a blow drying oven.

TABLE 3

| Examples | Time (days) | Yellow index (1) |
|---|---|---|
| 4 | 0 | 2.9 |
|  | 1 | 3.7 |
|  | 3 | 4.3 |
|  | 5 | 5.9 |
|  | 7 | 6 |
|  | 11 | 8 |
| 5 | 0 | 3.7 |
|  | 1 | 5.7 |
|  | 3 | 16.5 |
|  | 5 | 25.2 |
|  | 7 | 26 |
|  | 11 | 40.7 |

(1) norm ASTM D 1925

What is claimed is:

1. A polymerization process comprising:
polymerizing vinyl aromatic hydrocarbon monomers in the presence of a lithium catalyst while maintaining a temperature $T_1$ between 20 and 65 degrees centigrade in the presence of a solvent for a sufficient period of time to form a base polymer terminated by a lithium atom;
adding a conjugated diene in the presence of a solvent;
continuing the polymerization process while maintaining a temperature $T_2$ from 60 to 90 degrees centigrade, wherein the $T_2$ is greater than $T_1$; and
adding a coupling agent having from 3 to 7 epoxy groups per molecule at a temperature $T_3$ from 10 to 120 degrees centigrade.

2. The process of claim 1 wherein $T_3$ is not greater than 50 degrees centigrade.

3. The process of claim 1 wherein the polymerizing of vinyl aromatic hydrocarbon monomers in the presence of a lithium catalyst is started at a temperature of 50 to 55° C. and ended at a temperature of 60 to 65° C.

4. The process of claim 1 wherein the vinyl aromatic hydrocarbon is present in an amount from 30 to 50 percent by weight of the base copolymer.

5. The process of claim 1 wherein the vinyl aromatic hydrocarbon is styrene and the conjugated diene is butadiene.

6. The process of claim 5 wherein the styrene is present in an amount not greater than 40 percent of the base copolymer.

7. The process of claim 1 wherein the lithium catalyst is n-butyl lithium.

8. The process of claim 1 wherein substantially all of the vinyl aromatic monomer present in any final product is polymerized prior to adding the conjugated diene.

9. The process of claim 1 wherein $T_1$ is from 50 to 65 degrees centigrade, $T_2$ is from 60 to 90 degrees centigrade, and $T_3$ is not greater than 50 degrees centigrade.

10. A polymerization process comprising:
polymerizing styrene monomer in the presence of a lithium catalyst while maintaining a temperature between 20 and 65 degrees centigrade in the presence of a solvent;
adding a conjugated butadiene in the presence of a solvent;
continuing the polymerization process while maintaining a temperature from 60 to 90 degrees centigrade, wherein the polymerization temperature after the butadiene addition is higher than the polymerization temperature for styrene; and
adding a coupling agent having from 3 to 7 epoxy groups per molecule at a temperature of not greater than 50 degrees centigrade.

11. The process of claim 10 wherein the styrene is present in an amount not greater than 40 percent of the base copolymer.

12. The process of claim 10 wherein the polymerizing of styrene monomer in the presence of a lithium catalyst is started at a temperature of 50 to 55° C. and ended at a temperature of 60 to 65° C.

13. The process of claim 10 wherein the styrene is present in any final product in an amount from 30 to 50 percent by weight of the base copolymer.

14. The process of claim 10 wherein the styrene polymerization is at temperature of 50 to 65° C., the temperature for butadiene polymerization is from 60 to 90° C., and the addition of the coupling agent is at a temperature not greater than 50° C.

15. The process of claim 10 wherein substantially all of the styrene monomer present in any final product is polymerized prior to adding the conjugated diene.

16. A polymerization process comprising:
polymerizing styrene monomer in the presence of a lithium catalyst while maintaining a temperature between 50 and 65 degrees centigrade in the presence of a solvent for a sufficient period of time to convert substantially all of the styrene to polymer chains terminated by a lithium atom;
adding a conjugated butadiene in the presence of a solvent;
continuing the polymerization process while maintaining a temperature from 60 to 90 degrees centigrade, wherein the polymerization temperature after the butadiene addition is higher than the polymerization temperature for styrene; and adding a coupling agent having from 3 to 7 epoxy groups per molecule at a temperature of not greater than 50 degrees centigrade.

17. The process of claim 16 wherein the styrene is present in an amount not greater than 40 percent.

18. The process of claim 16 wherein the styrene monomer in the presence of a lithium catalyst is started at a temperature of 50 to 55° C. and ended at a temperature of 60 to 65° C.

19. The process of claim 16 wherein substantially all of the styrene monomer present in any final product is polymerized prior to adding the conjugated diene.

* * * * *